(12) United States Patent
Karnagel et al.

(10) Patent No.: US 11,620,547 B2
(45) Date of Patent: Apr. 4, 2023

(54) ESTIMATING NUMBER OF DISTINCT VALUES IN A DATA SET USING MACHINE LEARNING

(71) Applicant: Oracle International Corporation, Redwood Shores, CA (US)

(72) Inventors: Tomas Karnagel, Zurich (CH); Onur Kocberber, Baden-Daettwil (CH); Farhan Tauheed, Zurich (CH); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 325 days.

(21) Appl. No.: 16/877,882

(22) Filed: May 19, 2020

(65) Prior Publication Data

US 2021/0365805 A1 Nov. 25, 2021

(51) Int. Cl.
*G06N 5/04* (2006.01)
*G06N 20/00* (2019.01)

(52) U.S. Cl.
CPC ............... *G06N 5/04* (2013.01); *G06N 20/00* (2019.01)

(58) Field of Classification Search
CPC .................................. G06N 5/04; G06N 20/00
USPC .......................................................... 706/12
See application file for complete search history.

(56) References Cited

U.S. PATENT DOCUMENTS

| | | | |
|---|---|---|---|
| 6,226,629 B1 | 5/2001 | Cossock | |
| 7,213,012 B2 * | 5/2007 | Jakobsson | G06F 16/24542 |
| 7,849,032 B1 * | 12/2010 | Campos | G06N 3/08 |
| | | | 706/15 |
| 8,027,832 B2 | 9/2011 | Ramsey et al. | |
| 10,055,506 B2 * | 8/2018 | Rhodes | G06F 16/958 |
| 10,534,775 B2 * | 1/2020 | Moerkotte | G06F 16/24545 |
| 10,635,671 B2 * | 4/2020 | Sheng | G06F 16/24537 |
| 10,678,792 B2 * | 6/2020 | Ziauddin | G06F 16/2454 |
| 10,853,362 B2 * | 12/2020 | Qin | G06F 16/2255 |
| 10,983,976 B2 * | 4/2021 | Qin | G06F 16/2255 |
| 11,074,534 B2 | 7/2021 | Piccicuto et al. | |
| 11,157,471 B2 * | 10/2021 | P | G06N 20/00 |
| 11,176,487 B2 * | 11/2021 | Varadarajan | G06N 20/00 |
| 11,256,698 B2 * | 2/2022 | Idicula | G06N 3/0454 |
| 11,303,545 B2 * | 4/2022 | Kumar | G06F 16/21 |

(Continued)

FOREIGN PATENT DOCUMENTS

WO  WO 2018/222580  12/2018

OTHER PUBLICATIONS

Wikipedia, "Bloom Filter", https://en.wikipedia.org/wiki/Bloom_filter, edited Jul. 5, 2021, 23pgs.

(Continued)

*Primary Examiner* — Tauqir Hussain
(74) *Attorney, Agent, or Firm* — Hickman Becker Bingham Ledesma LLP

(57) ABSTRACT

Techniques for estimating the number of distinct values in a data set using machine learning are provided. In one technique, a sample of a data set is retrieved where the sample is a strict subset of the data set. The sample is analyzed to identify feature values of multiple features of the sample. The feature values are inserted into a machine-learned model that computes a prediction regarding a number of distinct values in the data set. An estimated number of distinct values that is based on the prediction is stored in association with the data set.

20 Claims, 3 Drawing Sheets

(56) References Cited

U.S. PATENT DOCUMENTS

| | | | | |
|---|---|---|---|---|
| 11,321,317 | B2* | 5/2022 | Su | G06F 16/24542 |
| 11,347,736 | B2* | 5/2022 | McConnell | G06F 16/24542 |
| 11,379,450 | B2* | 7/2022 | Fender | G06F 16/2282 |
| 2008/0086444 | A1* | 4/2008 | Yu | G06F 16/2455 |
| 2008/0306903 | A1* | 12/2008 | Larson | G06F 16/2462 |
| 2009/0006380 | A1 | 1/2009 | Agrawal et al. | |
| 2009/0006431 | A1 | 1/2009 | Agrawal et al. | |
| 2009/0228433 | A1 | 9/2009 | Aguilar Saborit et al. | |
| 2014/0122921 | A1 | 5/2014 | Imamichi et al. | |
| 2018/0341678 | A1* | 11/2018 | Moerkotte | G06F 16/24545 |
| 2019/0102427 | A1* | 4/2019 | Chakkappen | G06F 16/24532 |
| 2019/0236474 | A1* | 8/2019 | Smith | G06F 16/1724 |
| 2019/0256924 | A1 | 8/2019 | Vogelstein et al. | |
| 2020/0125545 | A1* | 4/2020 | Idicula | G06N 3/0445 |
| 2020/0134070 | A1 | 4/2020 | Sidoti et al. | |
| 2020/0340064 | A1 | 10/2020 | Gross et al. | |
| 2020/0377956 | A1 | 12/2020 | Vogelstein et al. | |
| 2021/0089533 | A1 | 3/2021 | Chen | |
| 2022/0091130 | A1 | 3/2022 | Marcotte et al. | |
| 2022/0253425 | A1 | 8/2022 | Budalakoti | |

OTHER PUBLICATIONS

Su et al. "Approximate Aggregates in Oracle 12C", CIKM'16, dated Oct. 24-28, 2016, Indianapolis, IN, USA, ACM, 10 pages.

Raab, M., et al., "Balls into Bins—A Simple and Tight Analysis", In: Randomization and Approximation Techniques in Computer Science. Random '98, LNICS, vol. 1518. Springer, (https://doi.org/10.1007/3-540-49543-6_13) 1998, 12pgs.

O'Neill, Ben, "The Classical Occupancy Distribution: Computation and Approximation", The American Statistician, https://doi.org/10.1080/00031305.2019.1699445, Dec. 19, 2019, 13pgs.

Mitzenmacher, M., et al., "The Power of Two Random Choices: A Survey of Techniques and Results", In Handbook of Randomized Computing, 2001, pp. 255-312, 60pgs.

Chakkappen, et al., "Efficient and Scalable Statistics Gathering for Large Databases in Oracle 11g", Proceedings of the 2008 ACM SIGMOD international conference on Management of data, Jun. 2008, 11pgs.

Azar, Yossi, et al., "Balanced Allocations", Proc. of 26th STOC (1994), 593-602, 180-200, https://www.cs.tau.ac.il/~azar/box.pdf, 30pgs.

Ahmed et al., "Automated Generation of Materialized Views in Oracle", Proceedings of the VLDB Endowment, vol. 13, No. 12, dated Aug. 2020, 13 pages.

Agarwal, Nipun, "MySQL Analytics Service", Oracle Labs, dated 2019, 22 pages.

My SQL, "13.7.2.1 Analyze Table Statement", https://dev.mysql.com/doc/refman/5.6/en/analyze-table.html, last viewed on Jun. 29, 2020, 3 pages.

Charikar et.al., "Towards Estimation Error Guarantees for Distinct Values", Proceedings of the nineteenth ACM SIGMOD-SIGACT-SIGART symposium on Principles of database systems dated May 2000, 12 pages.

Flajolet et al., "Hyperloglog: The Analysis of a Near-optimal Cardinality Estimation Algorithm". Discrete Mathematics and Theoretical Computer Science Proceedings. Dated 2007, 20 pages.

Haas et. Al., "Sampling-Based Estimation of the Number of Distinct Values of an Attribute", VLDB 1095, dated 1995, 12 pages.

Heule et al., "HyperLogLog in Practice: Algorithmic Engineering of a State of The Cardinality Estimation Algorithm", EDBT/ICDT '13 Mar. 18-22, 2013, Genoa, Italy, 10 pages. IBM Community Home, "Where am I", https://community.ibm.com/community/user/legacy?lang=en, last viewed on Jun. 29, 2020, 4 pages.

IBM MQ, "Analyze Command", IBM Insights, www.ibm.com/support/knowledgecenter/SSPT3X_4.2.0/com.ibm.swg.im.infosphere.biginsights.commsql.doc/doc/bsql_analyze, last viewed on Jun. 29, 2020, 9 pgs.

Burnham, K. P. et al., "Es-timation of the Size of a Closed Population when Capture Probabilities Vary Among Animals", Biometrika 65, vol. 65, Issue 3, Dec. 1978, pp. 625-633.

Microsoft, "Update Statistics", https://docs.microsoft.com/en-us/sql/t-sql/statements/update-statistics-transact-sql?view=sql-server-ver15, last viewed on Jun. 29, 2020, 10 pages.

My SQL, "14.8.11.1 Configuring Persistent Optimizer Statistics Parameters", ;https://dev.mysql.com/doc/refman/5.6/en/innodb-persistent-stats.html, last viewed on Jun. 29, 2020, 11 pages.

MYSQL, "8.3.7 InnoDB and MyISAM Index Statistics Collection", https://dev.mysql.com/doc/refman/5.7/en/index-statistics, last viewed on Jun. 29, 2020, 3 pages.

Oracle Help Center, "Database Performance Tuning Guide", Oracle Database Online Documentation Release 1 (11.1), https://docs.oracle.com/cd/B28359_01/server.111/b28274/stats.htm, dated Jun. 29, 2020, 2 pgs.

Oracle, "Database Performance Tuning Guide", 13 Managing Optimizer Statistics, https://docs.oracle.com/cd/B28359_01/server.111/b28274/stats.htm#PFGRF003, last viewed on Jun. 29, 2020, 27 pages. Oracle® Database Performance Tuning Guide, "13 Managing Optimizer Statistics", https://docs.oracle.com/cd/E25054_01/server.1111/e16638/stats, last viewed on Jun. 29, 2020, 30 pages.

Oracle8i interMedia Text Reference Release 2 (8.1.6), "Optimizing Queries with Statistics", https://docs.oracle.com/cd/A87860_01/doc/inter.817/a77063/aoptim2, last viewed on Jun. 29, 2020, 3 pages.

PostgreSQL 9.0, "Analyze", https://www.postgresql.org/docs/9.0/sql-analyze.html, last viewed on Jun. 29, 2020, 2 pages.

Kabra et al., "Efficient Mid-Query Re-Optimization of Sub-Optimal Query Execution Plans", AMC, dated 1998, 12 pages.

Zhou et al., "Database Meets AI: A Survey", IEEE Transactions on Knowledge and Data Engineering, https://ieeexplore.ieee.org/document/9094012>, May 2020, 20 pages.

Wikipedia, "Statistic", https_://en_.wikipedia_.org/w/index.php?title=Statistic&oldid=960557939, Jun. 2020, 4 pages.

Tauheed, U.S. Appl. No. 16/914,816, filed Jun. 29, 2020, Non-Final Rejection, dated Jun. 7, 2022.

Budalakoti, U.S. Appl. No. 17/168,459, filed Feb. 5, 2021, Non-Final Rejection, dated Apr. 11, 2022.

Karnagel, U.S. Appl. No. 17/387,841, filed Jul. 28, 2021, Notice of Allowance and Fees Due, dated Jul. 25, 2022.

Budalakoti, U.S. Appl. No. 17/168,459, filed Feb. 5, 2021, Notice of Allowance and Fees Due, dated Aug. 31, 2022.

Papapetrou et al., "Cardinality Estimation and Dynamic Length Adaptation for Bloom Filters", Springer Science+Business Media, DOI: 10.1007/s10619-010-7067-2, dated Sep. 2, 2010, 38 pages.

Tauheed, U.S. Appl. No. 16/914,816, filed Jun. 29, 2020, Non-Final Rejection dated Feb. 3, 2023.

Tauheed, U.S. Appl. No. 16/914,816, filed Jun. 29, 2020, Advisory Action dated Dec. 21, 2022.

\* cited by examiner

ESTIMATING NUMBER OF DISTINCT VALUES IN A DATA SET USING MACHINE LEARNING

TECHNICAL FIELD

The present disclosure relates to machine learning and, more particularly, to using machine learning to estimate a number of distinct values in a data set.

BACKGROUND

The number of distinct values (NDV) in a data set is needed in many cases, such as database query optimization, optimizing hash table creation, and optimizing dictionary creation (e.g., allocating the right size of dictionary).

A naïve approach to determining the NDV involves scanning the full data set (such as a list of values in a particular database column) and calculating the NDV. For columns with millions or billions of rows, this is not practical due to time and space constraints.

A better approach is to randomly sample the data set and estimate the NDV based on the sample. However, the sampling approach is not trivial because the NDV of the sample data many times does not mirror the NDV of the full data set. For example, a data set consists of one hundred elements and ten different values (0 to 9). Thus, the NDV is ten. Also, there are ten values of each distinct value. A random sample might be the following: [8, 6, 8, 5, 4, 9, 8, 0, 0, 4]. Here, the NDV is six. If it is assumed that the random sample is representative of the whole data set, then one would assume that the NDV of the entire data set is sixty (or NDV of sample divided by sample size and multiplied by the size of data set, or 6/10*100). An estimated NDV of the entire data set of sixty is six times larger than the actual NDV of the entire data set. Thus, current approaches to estimating the NDV of a data set are inaccurate and can lead to poor downstream decisions, such as automatically selecting one of multiple candidate query execution plans.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method of estimating the number of distinct values in a data set using machine learning are provided. In one technique, multiple features of a sample are extracted and input to a machine-learned model that has been trained on training data comprising training instances, each corresponding to a sample of a data set and including features of the sample and a label that is (or is based on) an actual NDV of the data set. In a related technique, a sample is divided into multiple chunks and features of individual chunks and groups of chunks are analyzed and used to train the machine-learned model.

In a related technique, an NDV estimator includes two machine-learned models: a classifier and a regressor. The machine-learned classifier is used to determine whether to apply certain rules in order to identify edge cases, or cases that the machine-learned regressor does not reliably produce accurate NDV estimates.

Embodiments herein improve computer-related technology, specifically NDV estimation technology, which is critical for producing accurate NDV estimates that are required for certain database functions. If an NDV estimate is inaccurate, then downstream database processes will suffer, such as producing a query execution plan that is extremely suboptimal, resulting in the overconsumption of computer resources and, potentially, in the termination of query execution.

System Overview

Figure 1:
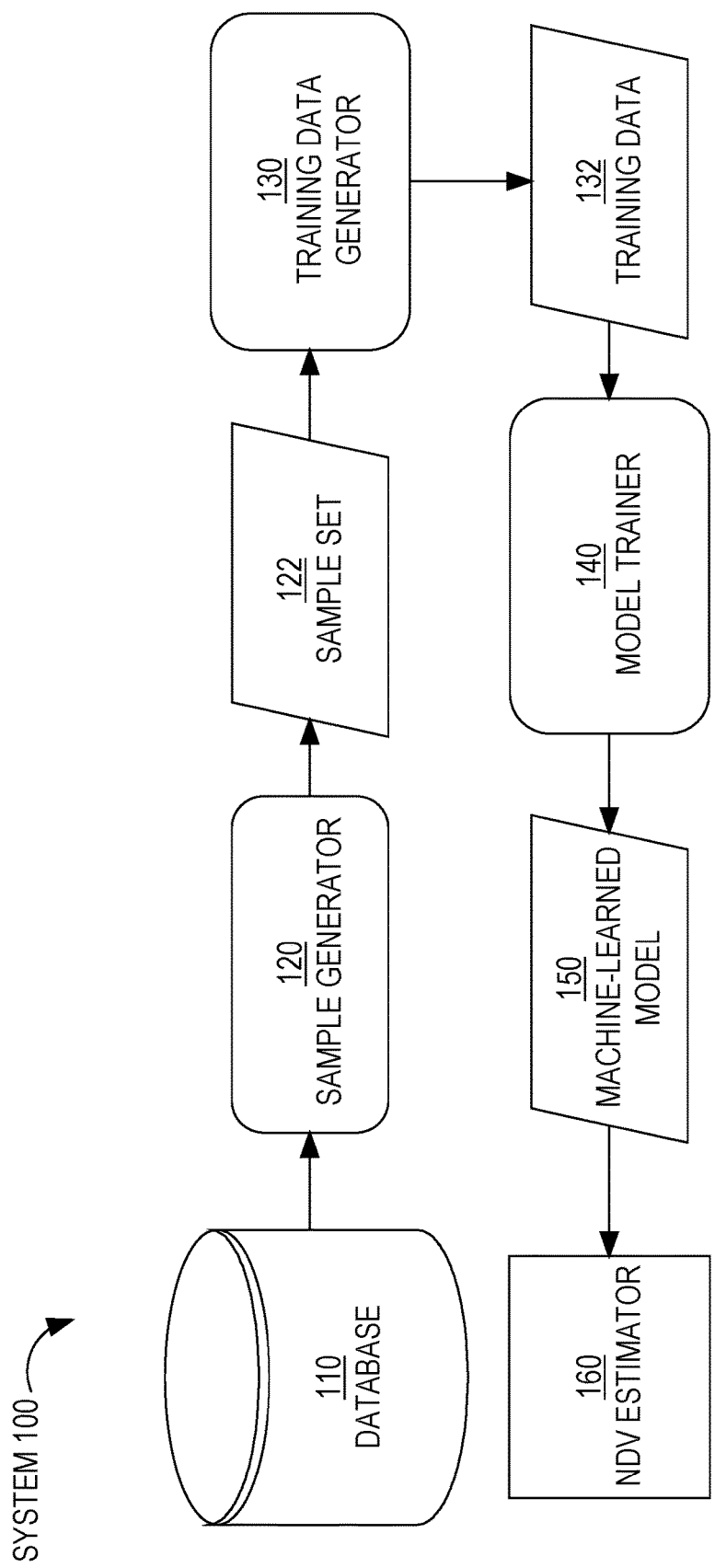
FIG. 1 is a block diagram that depicts an example system for estimating the NDVs of multiple data sets, in an embodiment.

FIG. 1 is a block diagram that depicts an example system 100 for estimating the NDVs of multiple data sets, in an embodiment. System 100 comprises a database 110, a sample generator 120, sample set 122, a training data generator 130, training data 132, a model trainer 140, a machine-learned model 150, and an NDV estimator 160. Each of sample generator 120, training data generator 130, model trainer 140, and NDV estimator 160 may be implemented in software, hardware, or any combination of software and hardware. While each of sample generator 120, training data generator 130, model trainer 140, and NDV estimator 160 is described as performing different functions, such functions may be performed by a single component or element of system 100, such as a single program, or by a different number of components or elements of system 100.

Database 110 is an organized collection of data that is stored and accessed electronically from a computer system. Although not depicted, a database management system (DBMS) is software that interacts with end users, applications, and database 110 itself to capture and analyze the data. The DBMS encompasses core facilities provided to administer the database. The sum total of database 110, the DBMS, and the associated applications may be referred to as a "database system."

While FIG. 1 depicts a single database, system 100 may include multiple databases. Database 110 comprises data stored on one or more computer storage devices. Database 110 may be part of volatile storage media or non-volatile storage media.

Examples of types of database 110 include relational databases, object-oriented databases, object-relational databases, NoSQL databases (such as key-value stores and document-oriented databases), and NewSQL databases. Some organizations employ databases of varying types.

Database 110 includes one or more data sets. A data set may correspond to any set of data, regardless of how the data is organized. For example, a data set may correspond to a subset of the data within a column of a table (e.g., the first million rows or all rows where the value is >T), all the data within a column of a table, all data within a table, all data within a key-value store, all word tokens within all documents, all word tokens within all documents have a creation date after a particular date, or all data of a particular data type (e.g., INTEGER, STRING, FLOATING POINT NUMBER, DATE) within a single table or across multiple tables.

To the extent that database 110 comprises multiple data sets, different data sets may have different boundary characteristics. For example, one data set whose NDV is estimated may be one column of a first table in database 110 while another data set whose NDV is estimated may be two columns of a second table in database 110.

Sample Generator

Sample generator 120 generates a sample of a data set and stores the sample in sample set 122. The data set may be from database 110 (as indicated in FIG. 1) or from another data source. Some data sets may be stored remote relative to system 100 while other data sets may be local relative to system 100. Sample generator 120 may be used to generate (a) samples for generating training instances (in which case the NDV of the samples is known) and/or (b) samples for estimating the NDVs of the corresponding data sets.

In order to generate a sample, input to sample generator 120 is data that indicates a data set. Sample generator 120 may be invoked automatically or based on user input. For example, a user or administrator of database 110 inputs, into a text field of a graphical user interface, a name of a table and a name of a column of the table. After specifying the two names and in response to selecting a graphical "Enter" button or pressing an "Enter" button on a physical keyboard, sample generator 120 identifies the data set and generates a sample therefrom.

Regarding automatically generating samples, sample generator 120 may sample each distinct data set that sample generator 120 automatically identifies. For example, in response to creation and population of a new table, sample generator 120 considers each column of the new table as a new data set and generates a sample for each column.

Sampling may be performed in multiple ways. For example, sampling may involve retrieving the first N elements or values in a data set. This sampling may be sufficient if it is known that the data set is relatively randomly shuffled. As another example, sampling may involve randomly selecting N elements or values in a data set. As another example, sampling may involve retrieving every Mth row from a table. This sampling may be sufficient if it is known or assumed that the data set is ordered based on the values that are sampled.

Regardless of whether sample generator 120 is invoked automatically or in response to user input that specifies a data set, sample generator 120 may be automatically invoked to generate another sample for the data set. The automatic generation of another sample may be performed on a regular basis (e.g., weekly), which may be pre-defined (or a default value) or may be defined based on input from a user/administrator. Additionally or alternatively, automatic generation of another sample may be performed in response to certain events, such as after an update or change to a certain number of values in the data set. For example, if more than 5% of a column is new since the last time a sample was generated for the column, then another sample of the column is generated. As another example, if more than 10% of the values in a column have changed since the last time a sample was generated for the column, then another sample of the column is generated.

In an embodiment, each sample that sample generator 120 generates is a certain percentage of a data set. For example, each sample is 1.5% of a data set. Alternatively, each sample is a fixed size, regardless of the size of the corresponding data set. For example, each sample is 100 MB.

In an embodiment, a sample is divided into multiple chunks. The chunks may be of equal (or near equal) size. For example, if a sample is 1.5% of a data set and three chunks are identified, then each chunk is 0.5% of the data set. As described in more detail below, some features of a sample may be based on individual chunks and/or combinations of chunks.

Machine Learning

Machine learning is the study and construction of algorithms that can learn from, and make predictions on, data. Such algorithms operate by building a model from inputs in order to make data-driven predictions or decisions. Thus, a machine learning technique is used to generate a statistical model that is trained based on a history of attribute values associated with users and regions. The statistical model is trained based on multiple attributes (or factors) described herein. In machine learning parlance, such attributes are referred to as "features." To generate and train a statistical model, a set of features is specified and a set of training data is identified.

Embodiments are not limited to any particular machine learning technique for generating a prediction model. Example machine learning techniques include linear regression, logistic regression, random forests, naive Bayes, and Support Vector Machines (SVMs). Advantages that machine-learned models have over rule-based models include the ability of machine-learned models to output a probability or a value within a certain range, the ability of machine-learned models to capture non-linear correlations between features, and the reduction in bias in determining weights for different features.

A machine-learned model may output different types of data or values, depending on the input features and the training data. For example, training data may comprise, for each sample of a data set, multiple feature values, each corresponding to a different feature of the sample. Example features are described in more detail herein. In order to generate the training data, information about each sample is analyzed to compute the different feature values. In this example, the label (corresponding to the dependent variable) of each training instance is an actual NDV of the corresponding data set or a value that is based on the actual NDV.

Initially, the number of features that are considered for training may be significant. After training and validating a model, it may be determined that a subset of the features have little correlation or impact on the final output. In other words, such features have low predictive power. Thus, machine-learned weights or coefficients for such features may be relatively small, such as 0.001 or −0.001. In contrast, weights of features that have significant predictive power may have an absolute value of 0.002 or higher. Features will little predictive power may be removed from the training data. Removing such features can speed up the process of training future models and making predictions.

Training Data

Training data generator 130 generates training data 132 for a to-be-trained model. Training data 132 may be based on samples in sample set 122 (as indicated in FIG. 1) and/or may be based on samples from another data source (not depicted).

Training data 132 comprises a set of training instances, each training instance corresponding to a different sample and comprising a set of feature values (corresponding to a set of features of each sample) and a label. Training data generator 130 has access to feature configuration data that defines the set of features and the label. The set of features include features about a sample and, optionally, about one or more chunks within the sample. Example features include the following:
 a. group_3_frequency_1
 b. new_values_1
 c. new_values_2/new_values_1
 d. group_3_frequency_2
 e. group_2_frequency_2/group_3_frequency_3
 f. new_values_1/group_3_frequency_2
 g. group_3_NDV
 h. new_values_2/group_3_frequency_2
 i. group_1_frequency_1
 j. group_3_NDV/cardinality
 k. group_3_frequency_4
 l. group_3_frequency_3
 m. new_values_2
 n. group_2_frequency 2

A description of the above notation is as follows:
 a. "group_1" refers to Group1, which is 1 chunk
 b. "group_2" refers to Group2, which is 2 chunks (combined)
 c. "group_3" refers to Group3, which is 3 chunks (combined)
 d. "group_1_frequency_1" refers to the ratio of (1) the number of elements that appear only once in Group1 to (2) the number of elements in Group1. In other words, "group_1_frequency_1" is the result of dividing (1) by (2).
 e. "group_2_frequency 2" refers to the ratio of (1) the number of elements that appear only twice in Group2 to (2) the number of elements in Group2.
 f. "group_3_frequency_1" refers to the ratio of (1) the number of elements that appear only once in Group3 to (2) the number of elements in Group3.
 g. "group_3_frequency_2" refers to the ratio of (1) the number of elements that appear only twice in Group3 to (2) the number of elements in Group3.
 h. "group_3_frequency_3" refers to the ratio of (1) the number of elements that appear only three times in Group3 to (2) the number of elements in Group3.
 i. "group_3_frequency_4" refers to the ratio of (1) the number of elements that appear only four times in Group3 to (2) the number of elements in Group3.
 j. "new_values_1" refers to the ratio of (1) the number of new values in Chunk2 compared to Chunk1 to (2) the number of elements in Chunk2. In other words, "new_values_1" is the result of dividing (1) by (2).
 k. "new_values_2" refers to the ratio of (1) the number of new values in Chunk3 compared to Group2 to (2) the number of elements in Chunk3.
 l. "group_3_NDV" refers to the NDV of Group3 divided by the number of elements in Group3.
 m. "group_3_NDV/cardinality" refers to the NDV of Group3 divided by the number of elements in the full data set (cardinality).

In an embodiment, a label for a training instance is a relative NDV. A relative NDV is defined as the NDV of a data set divided by the number of elements or values in the data set. For example, if the actual NDV of a data set is fifty and the number of values in the data set is one thousand, then the relative NDV is 5% or 0.05. Once the model is trained and the model is used to estimate (or predict) a relative NDV for a data set given a set of feature values of a sample of the data set, an estimate of the NDV may be computed by multiplying the relative NDV with the number of values/elements in the data set. In mathematical terms, estimated NDV=predicted relative NDV*total number of values.

Model trainer 140 implements one or more machine-learning techniques (e.g., a supervised learning technique, such as linear regression, support vector machines, or decision trees) to process training data 132 (or a portion thereof) in order to train machine-learned model 150. Once trained, machine-learned model 150 may be validated using a portion of training data 132 that was not used to train machine-learned model 150.

NDV Estimator

Once machine-learned model 150 is (optionally) validated, NDV estimator 160 estimates the NDV of a data set, which data set may come from a completely different data source than the data sets associated with samples whose features values are in the training data. NDV estimator 160 may leverage other components of system 100, such as database 110, sample generator 120, and machine-learned model 150. For example, NDV estimator 160 may be triggered automatically or based on user input that references a data set (e.g., input that specifies a column in database 110 to analyze or that specifies a name of a table of a remote database). In response to being triggered, NDV estimator 160 calls or invokes sample generator 120 that samples the referenced data set.

NDV estimator 160, based on a set of known features (e.g., specified in a feature configuration file) and generated sample, generates a set of feature values about the sample, each feature value corresponding to one of the known features in the set of known features and indicating a feature of the sample. NDV estimator 160 inputs the set of feature values into machine-learned model 150, which computes an output value that is an estimated NDV or an estimated relative NDV.

NDV estimator 160 may be a (e.g., web) service that is invoked by one or more remote clients, or clients that are remote relative to system 100. A client (not depicted in FIG. 1) sends a request for an estimated NDV of a data set. The data set may be local (e.g., in database 110) or remote relative to system 100. The request may include: (a) a reference to the data set (in which case NDV estimator 160 invokes sample generator 120 to generate a sample of the data set); (b) a reference to a sample of the data set (in which case NDV estimator 160 retrieves the sample and generates a set of feature values for and based on the sample); or (c) the sample itself (in which case NDV estimator 160 generates the set of feature values). Some client requests may include (a), while other client requests include (b) or (c) or both.

Once NDV estimator 160 generates (in response to a client request) a set of feature values based on a sample, NDV estimator 160 uses machine-learned model 150 by inputting the set of feature values therein and machine-learned model 150 outputting a value that represents an estimated NDV or an estimated relative NDV.

Aggregating Statistics Across Chunks

In an embodiment, machine-learned model 150 is improved by computing an aggregate (e.g., average or median) of Group1 and Group2 statistics. Otherwise, some features described above may be multiple features. For example, to compute the feature "group_1_frequency_1," the frequency count for values that appear only once in Group1 is divided by the number of elements in Group1. However, there are three chunks and, thus, three Group1s. Thus, one way to reduce the number of features is to aggregate statistics related to Group1 and Group2.

For example, in order to calculate the NDV of Group1 features where there are three chunks per sample (and, thus, there are three NDV measurements: one for each chunk), an average NDV per chunk is computed. As a specific example, if the NDVs of the three chunks are 15, 16, and 18, then the average NDV for Group1 is 16.33. As another example of aggregating Group1 statistics, in order to calculate a value for the feature "group_1_frequency_1," a frequency count for values that appear only once in a chunk is computed and those three values (because there are three chunks) are averaged to produce an average frequency count. Also, the number of elements in Group1 may be computed by dividing the sample size by three. Thus, a value for the feature "group_1_frequency_1" is calculating by dividing (1) the average frequency count for values that appear only once in each chunk by (2) the average number of elements in each chunk.

As an example of aggregating Group2 statistics, in order to calculate the NDV of Group2 features where there are three chunks per sample, there are three combinations for combining two chunks: Chunk1+Chunk2, Chunk2+Chunk3, and Chunk1+Chunk3. In this example, an average NDV for Group2 may be computed by (1) computing the average NDV of each combination and then (2) averaging the resulting three averaged NDVs again.

For Group3, there is only one combination (i.e., Chunk1, Chunk2, and Chunk3); thus, no aggregation is taken for Group3 statistics.

In the above examples, it is assumed that there are three chunks; however, embodiments are not so limited. Embodiments are applicable to any number of chunks. Thus, there might be N chunks and, for any number of chunks, the statistics may be averaged for all groups except for the group combining all chunks.

Label Transformation

In an embodiment, instead of using the relative NDV (or actual NDV) of a data set as a label for the corresponding training instance, a transformation of the relative NDV is used as the label. An example transformation is a logarithmic transformation. For example, a relative NDV of a data set is input to a log function and the output is used as the label for a training instance that corresponds to the data set. The log function could be any base, such as ten, three, or two. One benefit of this embodiment is that it may result in better predictions when the actual relative NDV is very small, such as under 1%.

In this embodiment, the output of the machine-learned model is input to an inverse log function to compute an estimated relative NDV.

Classification Approach to Detect Rules

A machine-learned model trained on training data as described herein might not be accurate in estimating NDV (or relative NDV) for certain data sets, such as data sets with relatively small NDVs (e.g., where the actual NDV is much smaller than the NDVs of all samples) and data sets with relatively large NDVs (e.g., where the actual NDV equals, or roughly equals, the cardinality of the data set).

In an embodiment, rules are constructed to account for such extreme cases or outliers. For example, if new_values_2=0 (or close to 0), then the estimated relative NDV=group_3_NDV/cardinality, where (a) new_values_2 is a ratio of (1) the number of new values in Chunk3 compared to Group2 to (2) the number of elements in Chunk3 and (b) group_3_NDV/cardinality is the NDV of Group3 divided by the number of elements in the full data set (cardinality). Such rules may be constructed manually or automatically.

In an embodiment, detecting rules is performed automatically. Such an approach may involve a machine-learned classifier that, given a set of feature values of a sample of a data set, assigns the sample to one of multiple classes. For each training instance that is used to train the machine-learned classifier, instead of using, as a label of the training instance, the actual NDV, the actual relative NDV, or a log of the actual relative NDV, the label of the training instance is one or more of the feature values of that same training instance.

The training instances that are used to train the machine-learned model may be the same as the training instances that are used to train the machine-learned classifier, except that the labels are different. For the former, the label of a training instance is based on the actual NDV of a data set that corresponds to the training instance; for the latter, the label of a training instance is one of the feature values of the training instance.

To determine which feature value (or combination of feature values) to assign as a label to a training instance for training the machine-learned classifier, multiple (e.g., all or a certain number of) training instances are analyzed. For each identified training instance and for each feature of the training instance, a count is incremented whenever the value of that feature equals the label (e.g., relative NDV) of the training instance. The higher the count of a feature, the more likely that the feature may be a good predictor of actual NDV on its own. If the counts of multiple features are the same or roughly the same (e.g., within 5% of each other) and the counts co-occur among the same training instances (e.g., 99% of the counts of feature A occur in the same training instances where the counts of feature B occur), then the multiple features are combined and used as a label class name.

For example, the following is a list of features and, for each listed feature, a number of times a value of the feature equaled the label (e.g., relative NDV or actual NDV) in a set of training instances:

a. group_3_frequency_1→1334
b. new_values_1→1334
c. new_values_2/new_values_1→1334
d. group_3_frequency_2→0
e. group_2_frequency_2/group_3_frequency_3→0
f. new_values_1/group_3_frequency_2→0 g. group_3_NDV→1334
h. new_values_2/group_3_frequency_2→1334
i. group_1_frequency_1→0
j. group_3_NDV/cardinality→5558
k. group_3_frequency_4→0
l. group_3_frequency_3→0
m. new_values_2→1334
n. group_2_frequency_2→0

The 1,334 training instances in which the six features had values that equaled the corresponding label are training instances where each value or element in the corresponding data set was unique. In other words, the actual NDV of the data set equals the number of elements in the data set. Thus, if, given a sample, the relative NDV of Chunk3 is 1.0 (100%) as indicated by group_3_frequency_1, new_values_1, and/or new_values_2/new_values_1, then the estimated relative NDV of the entire data set is 100%.

The 5,558 training instances in which the value of the group_3_NDV feature equaled the corresponding label are training instances where the actual NDV is relatively small, such as under ten, or the relative NDV is relatively small, such as less than 0.1%. Thus, if, given a sample, all unique values are observed in a sample as indicated by group_3_NDV/cardinality, then the estimated relative NDV of the entire data set is group_3_NDV/cardinality.

In this example, there are at least three classes: (1) 'group_3_NDV/cardinality'; (2) 'group_3_frequency_1'+ 'new_values_1'+'new_values_2/new_values_1'+ 'group_3_NDV'+'new_values_2/group_3_frequency_2'+ 'new_values_2'; and (3) 'rest.' After labeling each of the training instances with one of these three labels, one or more machine learning techniques (e.g., Random Forest Classification) are implemented to learn a coefficient or weight for each feature. The machine learning techniques effectively "learn" or figure out why certain features are the same as the label and encodes that discovery in a machine-learned classifier (or "classification model") that comprises multiple terms and operations that combine the terms, each term including a machine-learned weight and a feature value.

A second approach to assign classes is to train a single classification model per feature that has a match. For example, a first classification model is trained for feature F1 and a second classification model is trained for feature F2. Thus, the first classification model, given a set of feature values of a sample, produces output that indicates a likelihood that feature F1 matches the "true" label, such as the actual relative NDV or the actual NDV. Similarly, the second classification model, given the same set of feature values of the sample, produces output that indicates a likelihood that feature F2 matches the "true" label, such as the actual relative NDV or the actual NDV.

As a variation of the second approach to assigning classes, a threshold is applied to limit the number of classes/models to account for features that might match the true label by accident with no real meaning. For example, a feature must match in over three training instances in order for a classification model to be trained for that feature.

Table A lists values for ten training instances (i.e., an example value for each of features F1-F6 and for label Y) and, for each training instance, a list of features that match the corresponding label Y:

TABLE A

| F1 | F2 | F3 | F4 | F5 | F6 | Y | Features Matching Y |
|----|----|----|----|----|----|---|---------------------|
| 1  | 1  | 3  | 1  | 1  | 10 | 1 | F1, F2, F4, F5 |
| 2  | 2  | 4  | 5  | 2  | 9  | 4 | F3 |
| 3  | 1  | 3  | 1  | 3  | 8  | 3 | F1, F3, F5 |

TABLE A-continued

| F1 | F2 | F3 | F4 | F5 | F6 | Y | Features Matching Y |
|----|----|----|----|----|----|---|---------------------|
| 4  | 2  | 4  | 5  | 4  | 7  | 4 | F1, F3, F5 |
| 5  | 1  | 3  | 1  | 5  | 6  | 1 | F1, F4 |
| 6  | 2  | 4  | 6  | 5  | 5  | 4 | F3 |
| 7  | 1  | 3  | 1  | 4  | 4  | 9 | None |
| 8  | 2  | 4  | 6  | 3  | 3  | 9 | None |
| 9  | 1  | 3  | 1  | 2  | 2  | 3 | F3 |
| 10 | 2  | 4  | 6  | 1  | 1  | 4 | F3 |

Given this data in Table A, under the first classification model approach where there is a single multi-class classification model, class1 may be 'F1, F2, F4, F5,' class2 may be 'F3,' class3 may be 'F1, F3, F5,' class4 may be 'F1, F4,' and class5 may be 'none.'

Table B lists a number of times each feature in Table A matches label Y.

TABLE B

| Feature Name | Number of times Feature Matches Label Y |
|--------------|------------------------------------------|
| F1 | 4 |
| F2 | 1 |
| F3 | 6 |
| F4 | 2 |
| F5 | 3 |
| F6 | 0 |

Given the data in Table B, under the second classification model approach where a different classification model is trained for each class, five classification models may be trained: one for each of F1-F5, since F6 never matched label Y. In the variation of the second approach, if the threshold is three, then only two classification models would be trained: one for F1 and one for F3.

In an embodiment, after one or more classification models are trained, such classification models are invoked (e.g., by NDV estimator 160) using the feature values for a particular sample to determine which feature (if any) is likely to match the true NDV or true relative NDV. For example, in the first classification model approach, if the output is the class "none" or a value corresponding to "none" is higher than the values corresponding to the other classes, then machine-learned model 150 is used to estimate the NDV (or relative NDV). If, on the other hand, the output is one of the other classes (i.e., one of the feature classes) or if the value corresponding to one of the other classes is higher than the value corresponding to the "none" class, then the feature value(s) corresponding to that other class is/are used to estimate the NDV (or is the estimated relative NDV). Thus, machine-learned model 150 is not used to estimate the NDV of the sample.

In the second classification model approach, there is no "none" classification model. Instead, there is one classification model per feature. "None" would be equivalent to all classification models returning a "false," in which case machine-learned model 150 would be used to estimate the NDV of the sample. If the output of one of the classification models is "true", then the feature value(s) corresponding to that classification model is/are used to estimate the NDV (or is the estimated relative NDV). Thus, machine-learned model 150 would not be used to estimate the NDV of the sample.

Example Process

Figure 2:
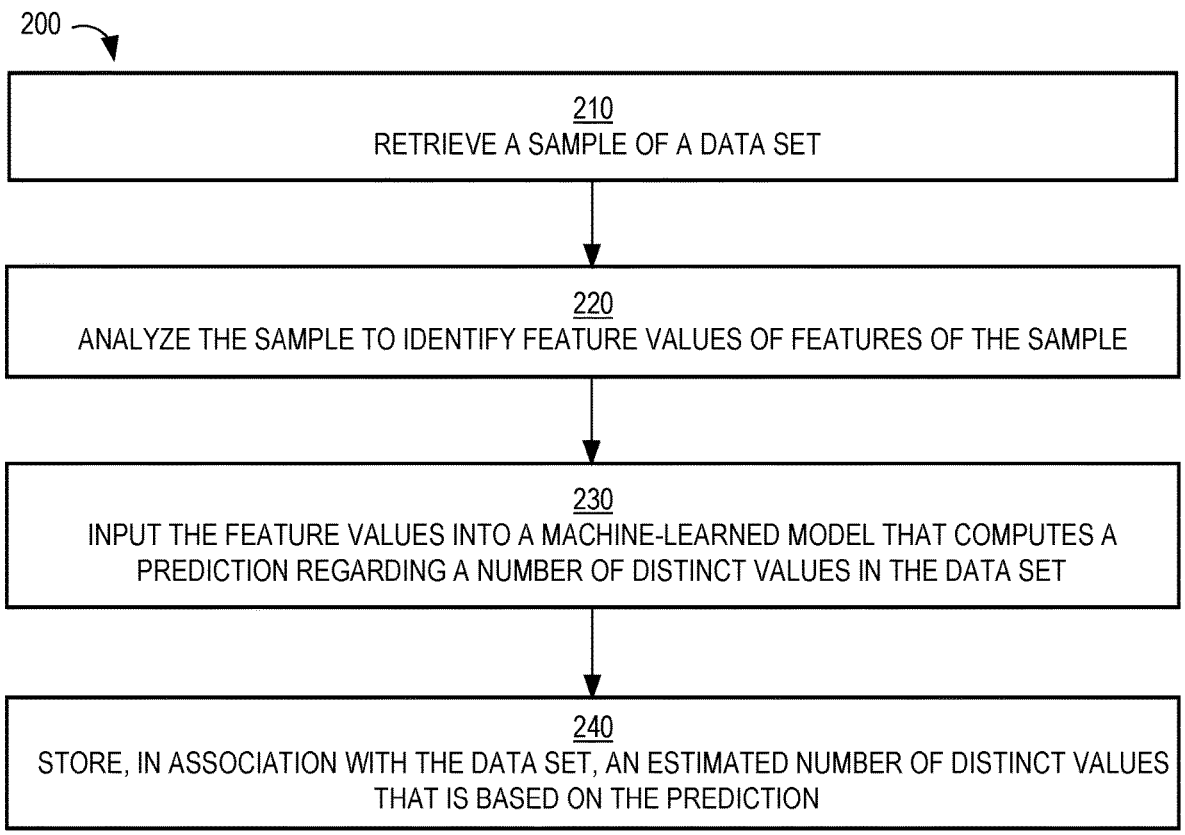
FIG. 2 is a flow diagram that depicts an example process for estimating the number of distinct values (NDV) of a data set, in an embodiment.

FIG. 2 is a flow diagram that depicts an example process 200 for estimating the number of distinct values (NDV) of a data set, in an embodiment. Process 200 may be performed by different components or elements of system 100.

At block 210, a sample of a data set is retrieved, where the sample is a strict subset of the data set. Block 210 may be performed by sample generator 120. For example, sample generator 120 access a certain portion of database 110 and reads rows (of a column of a table) corresponding to randomly generated numbers.

At block 220, the sample is analyzed to identify multiple feature values of features of the sample. Block 220 may be performed by NDV estimator 160 using a feature configuration file that describes how the different feature values may be computed.

At block 230, the feature values are input or inserted into a machine-learned model that computes a prediction regarding a number of distinct values in the data set. Block 230 may involve NDV estimator 160 inputting the identified feature values into machine-learned model 150 and executing the function(s) corresponding to machine-learned model 150. Block 230 may further involve executing a reverse log function on the prediction outputted by the machine-learned model in order to compute an estimated relative NDV.

At block 240 (which is optional), an estimated number of distinct values that is based on the prediction is stored in association with the data set. Additionally or alternatively, process 200 may have been triggered by a client request, in which case block 240 may involve generating a response and sending that response to the client. The response may indicate an estimated relative NDV. If the client request includes a size of the data set, then block 240 may additionally involve estimating an actual NDV by multiplying an estimated relative NDV by the size and reporting the estimated actual NDV to the client in the response.

In an embodiment where a classification model is trained, blocks 230-240 might not be performed. Instead, the feature values (identified in block 220) are input into the classification model (and, optionally, one or more other classification models). In that scenario, blocks 230-240 are performed only if the output of the one or more classification models indicates that the class is likely to be "none." If the output of the one or more classification models indicates that the class is one or more of the existing features of the machine-learned model, then a feature value of that existing feature is used to estimate the NDV (or relative NDV). For example, the feature value itself may be an estimated actual NDV or an estimated relative NDV.

In an embodiment, machine-learned model 150 (and any classification model) is trained by one party or entity and another party or entity leverages machine-learned model 150. Thus, in an embodiment, the party or entity that implements process 200 does not train machine-learned model 150. In a related embodiment, another party or entity sends electronic requests to the party or entity that leverages machine-learned model 150. In this way, three different parties or entities may be involved: one that trains machine-learned model 150, one that leverages machine-learned model 150 in response to requests for an NDV estimate, and one that requests the NDV estimate.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
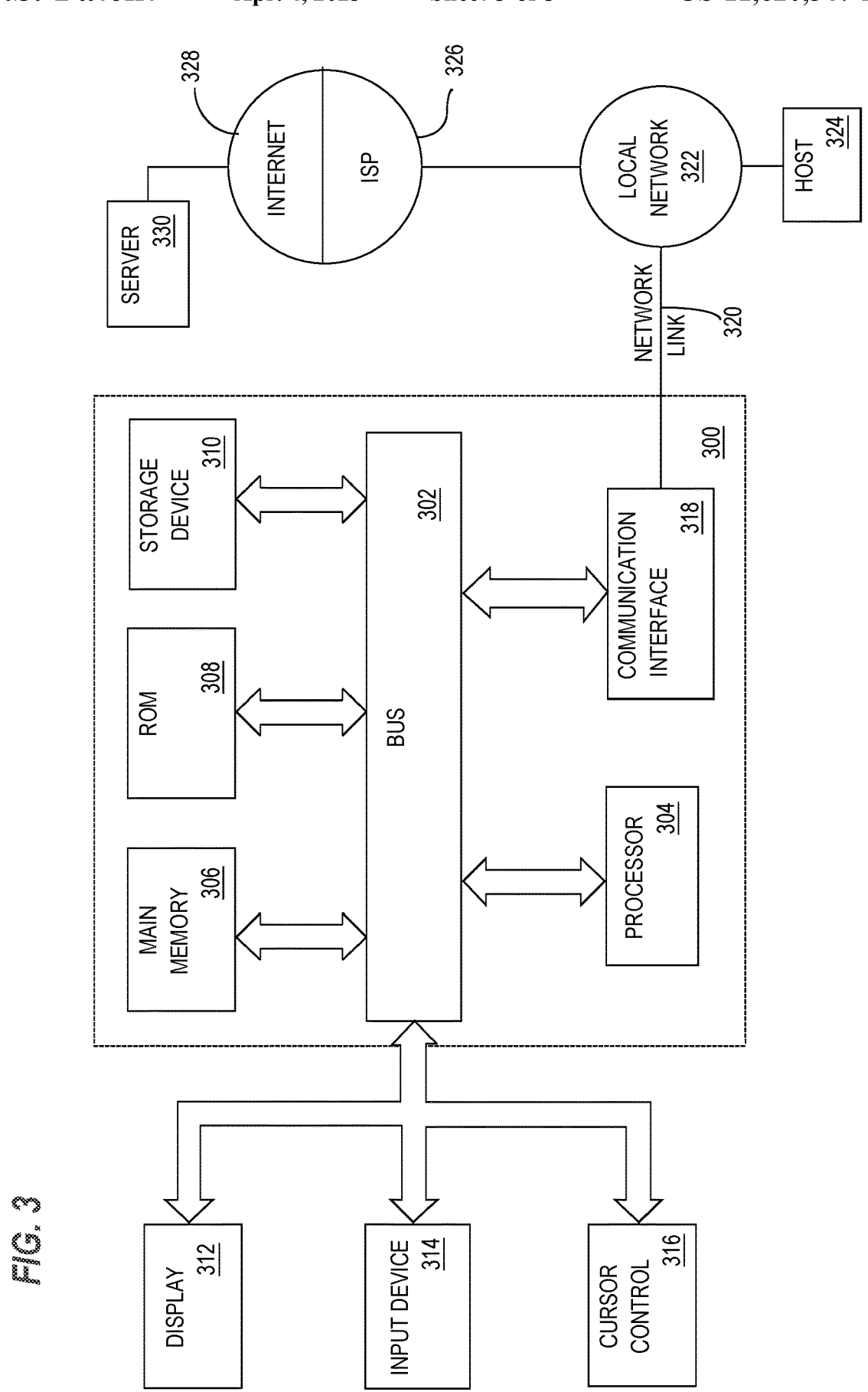
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   retrieving a sample of a data set, wherein the sample is a strict subset of the data set;
   analyzing the sample to identify a plurality of feature values of a plurality of features of the sample, wherein the plurality of features are features of a machine-learned model;
   inserting the plurality of feature values into the machine-learned model that computes a prediction regarding a number of distinct values in the data set;
   storing, in association with the data set, an estimated number of distinct values that is based on the prediction;
   wherein the method is performed by one or more computing devices.

2. The method of claim 1, wherein the prediction relates to a relative number of distinct values, further comprising:
   determining a number of values in the data set;
   computing a product of (1) the relative number of distinct values and (2) the number of values in the data set;
   wherein the estimated number of distinct values is the product.

3. The method of claim 2, wherein the prediction is a log of the relative number of distinct values, further comprising, prior to computing the product:
   computing an inverse log of the log of the relative number of distinct values to compute the relative number of distinct values.

4. The method of claim 1, further comprising:
   separating the sample into a plurality of chunks;
   wherein the plurality of features include (a) a first feature that based on an attribute of a single chunk in the plurality of chunks and (b) a second feature that is based on an attribute of all the plurality of chunks.

5. The method of claim 1, wherein a feature in the plurality of features is a ratio of (a) a number of values in the sample that appear only once in the sample to (b) a number of values in the sample.

6. The method of claim 1, further comprising:
   separating the sample into a plurality of chunks that includes a first chunk and a second chunk;
   wherein a feature in the plurality of features is a ratio of (1) a number of distinct values that are in the second chunk and that are not in the first chunk to (2) a number of values in the second chunk.

7. The method of claim 1, wherein a feature in the plurality of features is a ratio of (a) a number of values in the sample that appear only twice in the sample to (b) a number of values in the sample.

8. The method of claim 1, further comprising:
inserting a second plurality of feature values of a second plurality of features of the sample into a classification model that is different than the machine-learned model and that computes a classification prediction;
based on the classification prediction, determining whether to use the prediction computed by the machine-learned model.

9. The method of claim 8, wherein the data set is a first data set and the sample is a first sample, further comprising:
retrieving a second sample of a second data set that is different than the first data set, wherein the second sample is a strict subset of the second data set;
analyzing the second sample to identify a third plurality of feature values of the second plurality of features of the second sample;
inserting the third plurality of feature values into the classification model that computes a second classification prediction regarding a class of the second data set among a plurality of possible classes;
in response to determining that the second classification prediction is a particular class in the plurality of possible classes, identifying a strict subset of the third plurality of feature values and computing a second estimated number of distinct values based on the strict subset of the third plurality of feature values and not based on any output of the machine-learned model.

10. The method of claim 8, further comprising:
storing a plurality of training instances for training the machine-learned model;
for each training instance of the plurality of training instances:
determine whether a feature value of said each training instance matches a label of said each training instance;
if it is determined that a feature value of said each training instance matches the label of said each training instance, then including, in said each training instance, a class value from a set of class values;
if it is determined that no feature value in said each training instance matches the label of said each training instance, then including, in said each training instance, a second class value that is outside the set of class values;
using one or more machine learning techniques to train the classification model based on the plurality of training instances.

11. A method comprising:
identifying a plurality of feature values of a plurality of features of a sample of a data set, wherein the plurality of features are features of a machine-learned model;
inserting the plurality of feature values into the machine-learned model that computes a prediction regarding a number of distinct values in the data set;
storing, in association with the data set, an estimated number of distinct values that is based on the prediction;
wherein the method is performed by one or more computing devices.

12. One or more storage media storing instructions which, when executed by one or more processors, cause:
retrieving a sample of a data set, wherein the sample is a strict subset of the data set;
analyzing the sample to identify a plurality of feature values of a plurality of features of the sample, wherein the plurality of features are features of a machine-learned model;
inserting the plurality of feature values into the machine-learned model that computes a prediction regarding a number of distinct values in the data set;
storing, in association with the data set, an estimated number of distinct values that is based on the prediction.

13. The one or more storage media of claim 12, wherein the prediction relates to a relative number of distinct values, wherein the instructions, when executed by the one or more processors, further cause:
determining a number of values in the data set;
computing a product of (1) the relative number of distinct values and (2) the number of values in the data set;
wherein the estimated number of distinct values is the product.

14. The one or more storage media of claim 13, wherein the prediction is a log of the relative number of distinct values, wherein the instructions, when executed by the one or more processors, further cause, prior to computing the product:
computing an inverse log of the log of the relative number of distinct values to compute the relative number of distinct values.

15. The one or more storage media of claim 12, wherein the instructions, when executed by the one or more processors, further cause:
separating the sample into a plurality of chunks;
wherein the plurality of features include (a) a first feature that based on an attribute of a single chunk in the plurality of chunks and (b) a second feature that is based on an attribute of all the plurality of chunks.

16. The one or more storage media of claim 12, wherein a feature in the plurality of features is a ratio of (a) a number of values in the sample that appear only once in the sample to (b) a number of values in the sample.

17. The one or more storage media of claim 12, wherein the instructions, when executed by the one or more processors, further cause:
separating the sample into a plurality of chunks that includes a first chunk and a second chunk;
wherein a feature in the plurality of features is a ratio of (1) a number of distinct values that are in the second chunk and that are not in the first chunk to (2) a number of values in the second chunk.

18. The one or more storage media of claim 12, wherein a feature in the plurality of features is a ratio of (a) a number of values in the sample that appear only twice in the sample to (b) a number of values in the sample.

19. The one or more storage media of claim 12, wherein the instructions, when executed by the one or more processors, further cause:
inserting a second plurality of feature values of a second plurality of features of the sample into a classification model that is different than the machine-learned model and that computes a classification prediction;
based on the classification prediction, determining whether to use the prediction computed by the machine-learned model.

20. The one or more storage media of claim 19, wherein the data set is a first data set and the sample is a first sample, wherein the instructions, when executed by the one or more processors, further cause:

retrieving a second sample of a second data set that is different than the first data set, wherein the second sample is a strict subset of the second data set;

analyzing the second sample to identify a third plurality of feature values of the second plurality of features of the second sample;

inserting the third plurality of feature values into the classification model that computes a second classification prediction regarding a class of the second data set among a plurality of possible classes;

in response to determining that the second classification prediction is a particular class in the plurality of possible classes, identifying a strict subset of the third plurality of feature values and computing a second estimated number of distinct values based on the strict subset of the third plurality of feature values and not based on any output of the machine-learned model.

* * * * *